United States Patent [19] [11] 4,372,350
Schmidt et al. [45] Feb. 8, 1983

[54] MACHINE FOR THE AUTOMATIC PRODUCTION OF WELDED LATTICE GIRDERS

[75] Inventors: Gerhard Schmidt; Klaus Ritter; Gerhard Ritter; Josef Ritter, all of Graz, Austria

[73] Assignee: EVG Entwicklungs-und-Verwertungs Gesellschaft mbH, Graz, Austria

[21] Appl. No.: 173,672

[22] Filed: Jul. 29, 1980

[30] Foreign Application Priority Data

Aug. 3, 1979 [AT] Austria ................ 5340/79

[51] Int. Cl.³ ............... B21F 15/08; B21F 27/10
[52] U.S. Cl. .................. 140/112; 219/56; 228/173 E
[58] Field of Search ........ 140/105, 112; 29/155; 219/56, 57, 58, 79; 228/173 D, 173 E, 182

[56] References Cited

U.S. PATENT DOCUMENTS 2,899,537 8/1959 Grebner .................. 219/79
3,487,861 1/1970 Fahrenbach ............. 219/56 X
4,291,732 9/1981 Artzer ..................... 140/105 X

FOREIGN PATENT DOCUMENTS 317648 9/1974 Austria ..................... 140/112
1076609 8/1960 Fed. Rep. of Germany .
2349732 4/1975 Fed. Rep. of Germany .

Primary Examiner—Gil Weidenfeld
Assistant Examiner—Fred A. Silverberg
Attorney, Agent, or Firm—Ernest F. Marmorek

[57] ABSTRACT

A lattice girder making machine has a stepwise feed mechanism for upper and lower chord wires; and a continuously operating bending mechanism for bending wire into zigzag strutting which is welded to the chord wires at a welding station. Between the bending mechanism ad the welding station the zigzag strutting slides along guides which allow the strutting alternately to contract resiliently and then to expand to accommodate the stepwise advance through the welding station. At the welding station the strutting is held at the required extension by fingers.

2 Claims, 7 Drawing Figures

MACHINE FOR THE AUTOMATIC PRODUCTION OF WELDED LATTICE GIRDERS

The invention relates to a machine for the automatic production of welded lattice girders which consist of an upper chord, at least one lower chord and a zigzag-shaped arrangement of struts between the upper chord and each lower chord, the machine comprising feed mechanisms for the stepwise feeding of wire material for the chords, a continuously working bending mechanism for the production of a stock of strutting bent in the shape of a zigzag and an intermittently working welding mechanism for welding the points of bend of the strutting to the chords. Such a machine is hereinafter referred to as of the kind described.

BACKGROUND OF THE INVENTION

In the case of a known machine of this kind (West German O/S No. 23 49 732) the wires forming the strutting are continuously bent and are subsequently welded to chord rods intermittently. In order to be able to coordinate these two working procedures, which run with different rhythms, a stock of the already bent strut wire is bent into a loop running from the bending station for this wire to the welding station for the welding of this wire to the chord rods. The size of the loop to be formed is left to the judgement by eye and the experience of the machine operator. The free space for the formation of the loop must be sufficiently large in order to avoid permanent deformations of the strut material while running round the loop. Such permanent deformations transversely to the plane of the strutting would be extremely disadvantageous in the end product, in particular because the girders to be produced should have a planar structure. Three-dimensional girders cannot be produced at all with the known machine because, with the formation of a loop of wire strutting which is acceptable in practice, only one arrangement of struts can be fed to the welding station.

SUMMARY OF THE INVENTION

The invention is concerned with the problem of creating a machine of the kind described, suitable for automatic production of lattice girders, by which with a relatively small requirement of space, planar and three-dimensional lattice girders can be produced and in which a completely regular run of the strutting is positively ensured.

This problem is solved in accordance with the invention in that between the bending mechanism and the welding mechanism there are provided guides, which embrace bending regions of the zigzag strutting and which lead substantially tangentially into the paths of the upper chord wire and of at least one lower chord wire respectively and which forms storage means for the zigzag strutting so that strutting can be resiliently contracted and extended. The welding mechanism is provided, close to the path of feed of the or each lower chord wire, and offset with respect to one another in the direction of feed by one wavelength of the zigzag, two holding fingers, which, in the pauses used for the welding between two steps in the feed of the chord wires, are inserted into adjacent lower bending regions in the zigzag strutting to fix the required relative positions between the strutting and the chords during the welding.

In this manner, the use of the guides which embrace the bending regions of the zigzag strutting and lead tangentially into the paths of the upper chord wire and a lower chord wire respectively, provide an exact positive lateral guidance of the strutting with respect to the chord wires to which it is to be welded. By comparison with the known machine, in which the zigzag strut material forms a wire stock in the shape of a loop of varying length, the machine according to the invention forms, between the aforesaid side guides for this wire material, a stock of wire which can be resiliently contracted and expanded, namely the distances between the bending regions of the wire strutting material are alternately increased and reduced. By the employment of two holding fingers which can be introduced into adjacent bending regions, the bend zones, however, are separated prior to the welding to the desired separation necessary for the achievement of uniform strutting.

It may be mentioned that mechanisms for the bending of uniformly fed wire into zigzag shape are in themselves known from, for example, the West German A/S No. 1 076 609 and the Austrian Patent Specification No. 317 648. In principle they are constructed for that upon two parallel endless chains offset from one another by half a wavelength of the required run of the zigzag, rows of wire deflector pins circulate projecting from the chain orbits, whilst in a plane tangential to these orbits two tilting bending arms are provided which, by means of a pin arranged at the free end of each arm alternately seize the wire to be bent and lay it round one deflector pin of the associated rows of pins.

BRIEF DESCRIPTION OF THE DRAWING

Further features and advantages of the invention appear from the description below of a preferred embodiment of the invention by reference to the drawings. In the drawings.

DESCRIPTION OF THE PREFERRED EMBODIMENTS

The illustrated machine rests upon a machine frame 1 at the upper side of which there is provided a sliding guide 2 on which is slidable in the vertical direction a housing 3, in which holding-and-welding members for an upper chord wire 4 of the girder are accommodated.

Figure 3B:
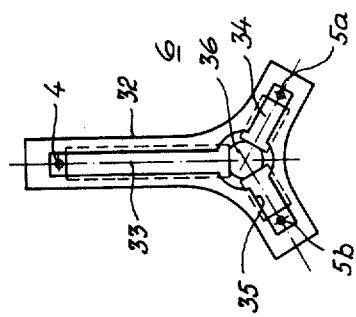
FIGS. 3a and 3b show the chord wire feed mechanism in diagrammatic longitudinal and cross-section respectively.
Figure 3A:
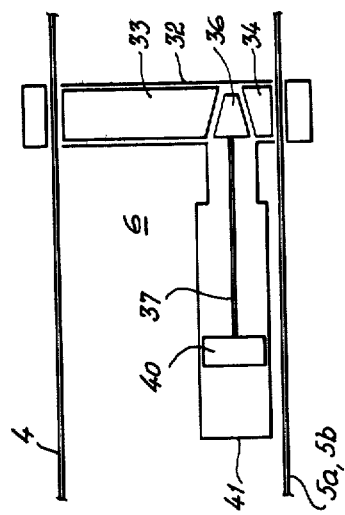

The upper chord wire 4 together with two longer chord wires 5a, 5b are fed forward in steps by a feed mechanism designated in general by 6 and illustrated in more detail in FIGS. 3a and 3b, the wire material needed for the chord wires being drawn off reels which are not shown. The strut wires 7a, 7b are also drawn off reels which are not shown, but the feed of these wires is effected not in steps, but at a uniform speed.

The whole machine is driven, for example, by an electric motor 10 via sprockets 11, 12 and a chain 13. The sprocket 12 is connected to a bevel gear 14 which meshes with a second bevel gear 15. The bevel gear 15 in turn drives, via a shaft 16, a bending mechanism 17 for the strut wires and, on the other side via a bevel gear 20, a shaft 21.

Figure 1:
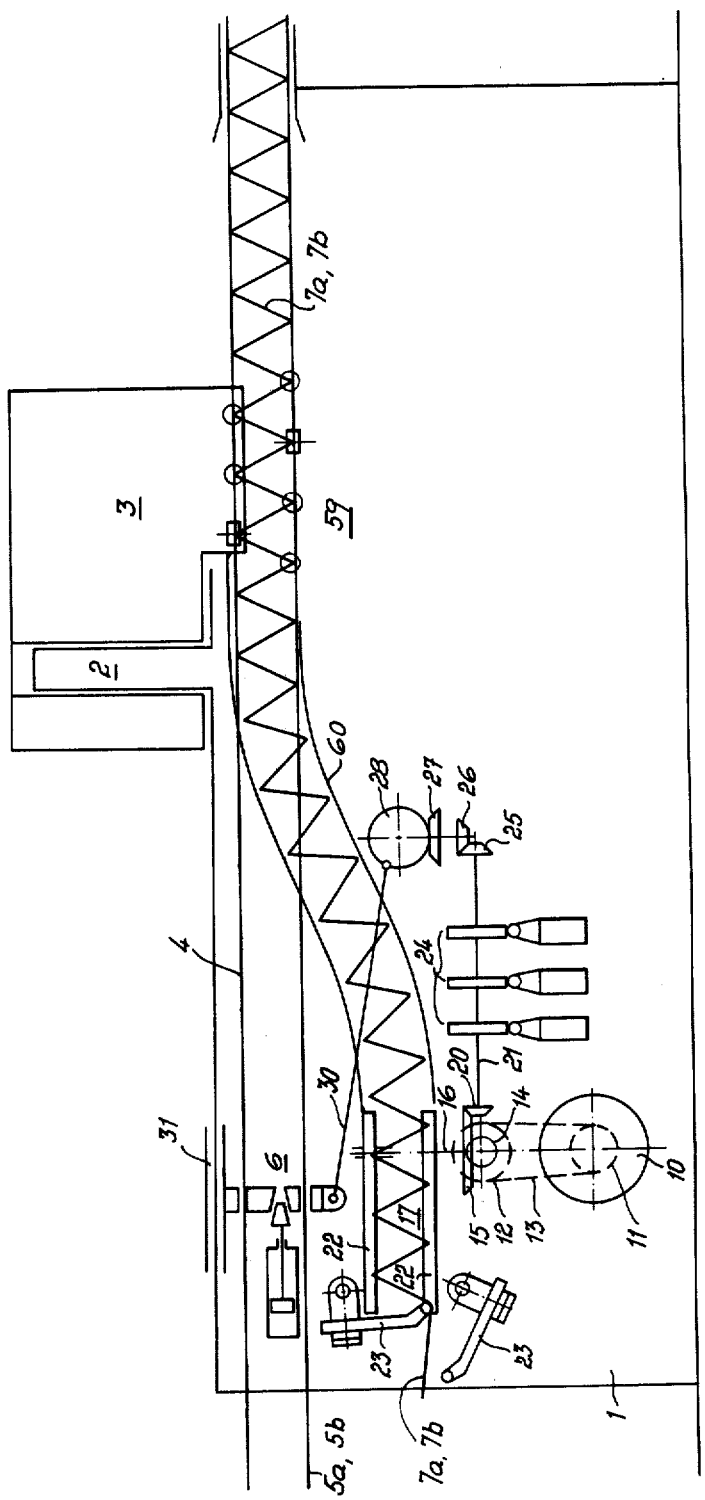
FIG. 1 is a diagrammatic longitudinal section through a machine in accordance with the invention.

The bending mechanism for the strut wires, illustrated only diagrammatically in FIG. 1, works essentially according to the principle described in the Austrian Patent Specification No. 317 648. Two circulating endless chains 22, carry wire deflector pins, and the strut wire 7a runs in and is laid by bending levers 23, which can tilt in a common plane tangential to the orbits of the chains, alternately around a deflector pin on the endless chain 22 associated with the respective lever so that the wire 7a gets bent in the shape of a zigzag and then enters guides 60. These guides are U-shaped in cross-section and embrace the bending regions of the zigzag-shaped wire. These guides run as may be seen from FIG. 1, with an S-shaped curvature up to the welding point on the machine. In the case of the employment of two strut wires there is naturally provided also for the second wire 7b a similar bending mechanism with connecting guides for the bent wire.

The shaft 21 carries a number of cam discs 24 and, on its end opposite from the bevel gear 20, a second bevel gear 25. Via bevel gears 25, 26 and 27 a crank 28 is finally driven by the shaft 21, and is connected via a connecting-rod 30 to the feed mechanism 6 for the chord wires. This mechanism, as illustrated more clearly in FIG. 3, is guided in a sliding guide 31 (FIG. 1) so as to be movable longitudinally in the machine frame 1. It consists essentially of a three-armed housing 32 which has in each of the three-arms a guide for one of the chord wires 4, 5a, 5b. Three plungers 33, 34, 35 are guided to slide in the housing 32, and can be forced against the chord wires resting in the guides to act as wire clamps. A triangular wedge 36 is connected to a piston rod 37 of a piston 40 arranged in an operating cylinder 41. When, via pressure-medium piping (not shown), the piston is acted upon by the pressure-medium in the direction towards the housing 32, the wedge 36 spreads the plungers 33, 34, 35 apart and forces them against the chord wires 4, 5a, 5b. The wires are thus clamped between the housing and the plungers so that by the action of the connecting-rod 30 they are fed forwards by the feed mechanism 6 towards the welding station.

Whilst the chord wires 4, 5a, 5b get fed forwards by the feed mechanism 6 in steps towards the welding station, the strut wires 7a, 7b travel at constant speed and are bent in the bending mechanism 17 into the shape of a zigzag and are slid along the guides 60, into position relative to the chord wires 4, 5a, 5b, ready for welding.

The guides 60 at the same time also form storage means in which, during the stationary periods in the feed of the chord wires 4, 5a, 5b, the strut wires 7a, 7b are held elastically deformed and compressed like the bellows of a concertina until the chord wires execute a further feed step. As soon as the chord wires execute this next feed step, the spring force stored in the strutting resting in the guides 60 is relieved so that no tractive effort worth mentioning is needed from the forwardly moving chord wires on the strut wires in order to set in motion the strutting lying in the guides 60 between the bending mechanism and the welding station.

In the welding mechanism there are adjusting-and-holding fingers 61 which, like lower electrodes 42 and the wedge 36 of the feed mechanism 6 for the chord wires, are actuated via pistons acted upon hydraulically and controlled by cams. Upon completion of one feed step of the chord wires the fingers 61 arranged one behind the other at a spacing of one wavelength of the zigzag, engage from above in two adjacent lower bending regions of each of the two strut wires 7a, 7b and in cooperation with abutments 62 force them into the correct position with respect to the lower chord wires 5a, 5b.

By means of the fingers 61 the strutting is also prevented from moving onwards under the action of the continuously working bending mechanism 17, and furthermore the fingers 61 also secure exactly in space the upper bending region lying between the two secured lower bending region of the strutting. This is so because two straight sections of wire of the strutting, connecting these three bending regions, and the fixed mutual spacing of the fingers form a triangle having predetermined side lengths. The upper bending region of the strut wires so positioned then lies exactly between the two upper electrodes 63, which are preferably likewise actuated hydraulically.

Figure 5B:
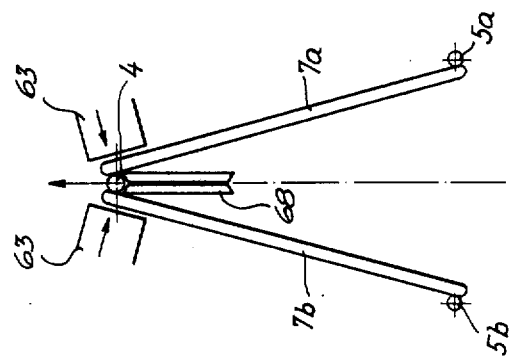
FIGS. 5a and 5b show in side and end elevation the guidance mechanism for the upper chord wire in the welding region.
Figure 5A:
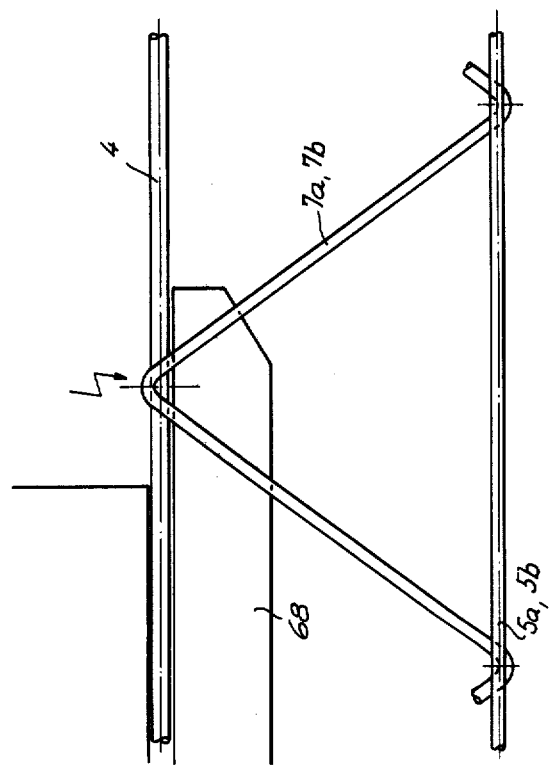

The structure which exists at the upper chord wire 4 after welding of the strutting has been effected, is, like the two lower boom wires, still movable in any direction in space. Upper guides 64 which may be brought hydraulically into engagement with the upper chord 4 and raised from it again, can be adjusted in the direction of the arrow P1 and fixed. A lower guide 65 cooperating with an hydraulically actuable dolly 66 can likewise be adjusted in the direction of the arrows P2 and P3 and fixed. By an adjustment of the guides 64 and 65 in the specified directions, by which these members are displaced with respect to a stationary lower current bridge 67, a completely straight girder may be produced, or optionally also one curved to take account of deformation to be expected under loading. At the time of the welding process the lower electrodes 42 work in unison with the upper electrodes 63, guides 68 being provided in the region of the upper electrodes, as shown in FIGS. 5a and 5b, to prevent shifting of the upper chord wire 4 under the pressure of the upper electrodes 63 acting obliquely downwards.

The guides 63, 64 and 68 are accommodated in the housing 3 and can thereby be adjusted in height with respect to the members 42, 61, 62, 65, 66 and 67, so that girders of different heights may be produced on the same machine.

Figure 4:
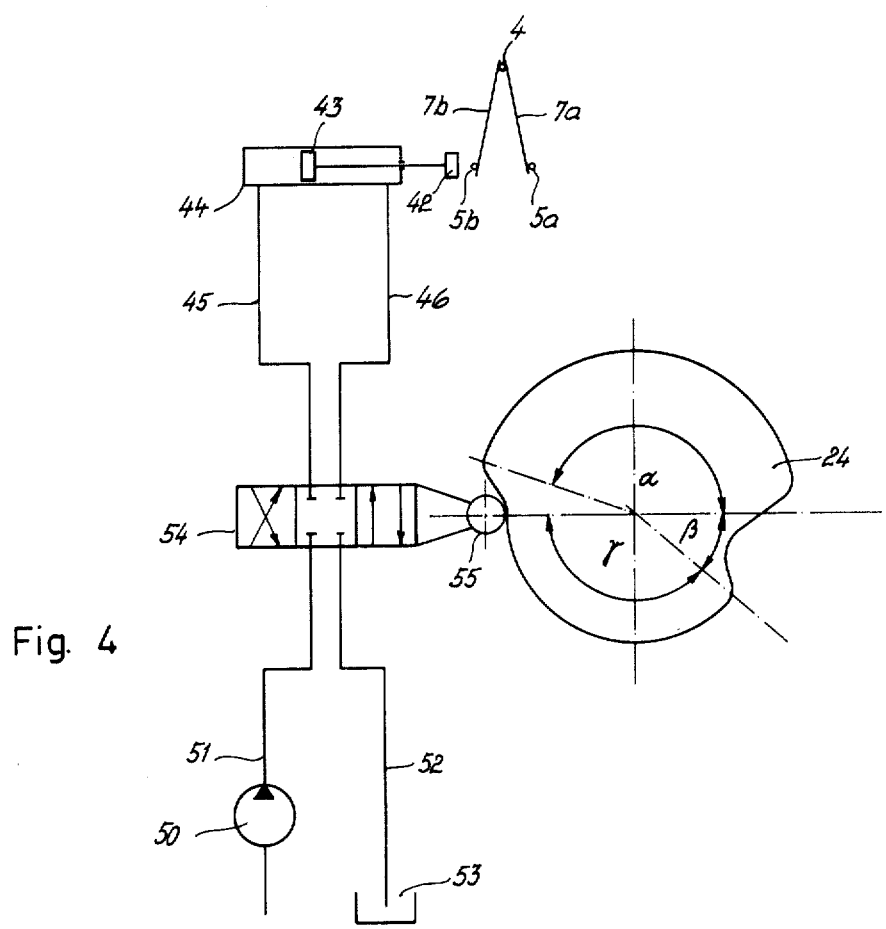
FIG. 4 shows an hydraulic actuation mechanism for the welding electrodes.

As an example of an advantageous construction of the hydraulic control of all of the controllable members of the machine, a control is illustrated in FIG. 4 of the lower electrode 42 of the welding mechanism.

Each electrode 42 is actuated by a piston 43 which is guided to slide in an operating cylinder 44. The operating cylinder is fed via two pressure-medium pipes 45, 46. A pump 50 supplies pressure-medium into a pipe 51, and a pipe 52 leads to a sump 53 for the pressure-medium, from which the pressure medium is finally passed back again to the pump via pipes which are not shown. Depending upon its position, an hydraulic valve 54 allows all four pipes 45, 46, 51, 52 to be blocked or optionally the pipe 51 to be connected to the pipe 45 and simultaneously the pipe 46 to the pipe 52 or the pipe 45 to the pipe 52 and simultaneously the pipe 51 to the pipe 46. The position of the hydraulic valve 54 is determined by a sensing roller 55 which is pressed by a spring against one of the cam discs 24.

In the position shown in FIG. 4, all four pressure-medium pipes are blocked. When the control cam 24 turns counter-clockwise out of the position shown in FIG. 4, the sensing roller 55 arrives on the raised circumferential portion of the control cam 24 and remains on this circumferential portion until the whole range of the angle α has been passed. In this position the pipes 51 and, 45 and respectively the pipes 46 and 52 are connected together and the piston 43 brings the electrode 42 into contact with the material to be welded and holds it firmly in this position.

Upon further turning of the control cam 24 counter-clockwise the sensing roller 55 now arrives in the range of angle β. Whilst the angle β is being traversed, the pipe 45 is connected to the pipe 52 and the pipe 51 to the pipe 46. The action upon the piston 43 is in this position of the valve the opposite of what it was previously, so that the piston 43 raises the electrode 42 from the material being welded.

In this position of the valve the electrode 42 moves towards the left until the sensing roller 55 enters the range of angle γ. As soon as this happens, the position shown in FIG. 4 has been reached again and the piston 43 and with it the electrode 42 remain in the position reached by the sensing roller 55 during the passage through the range of the angle β. It is essential for the cam control described, that the possible stroke of the controlled piston is made adequately long in order to allow the piston, upon withdrawal of the tool being actuated by it out of the operating position, to cover a travel backwards which is proportional to the time of action of the pressure-medium.

With the aid of this description of the operation the advantage achievable by means of this cam control may be explained. The travel which the piston 43, and with it the electrode 42, covers backwards during the passage through the range of the angle β, is proportional to the time necessary therefor. If the control cam 24 is turned slowly, then the sensing roller 55 remains longer within the range of the angle β than if the control cam turns faster. Hence with the control cam 24 turning slowly, the electrode 42 is removed further from the material being welded than would be the case with the control cam 24 turning more quickly.

Now since the pressure generated by the pump 50 is constant, upon entry of the sensing roller 55 into the range of the angle α the same time elapses until the laying of the electrode 42 against the material to be welded, as was available for the withdrawal of the electrode from the operating position. Hence with the control cam 24 rotating rapidly, which is equivalent to high operating speed of the machine, the electrodes are brought again into contact with the material to be welded, in a very much shorter time since they now cover only a very short travel, whereas in the case of the machine running slowly the length of time needed for moving the electrodes against the material to be welded will be longer just like the travel covered backwards by the electrodes.

Figure 2:
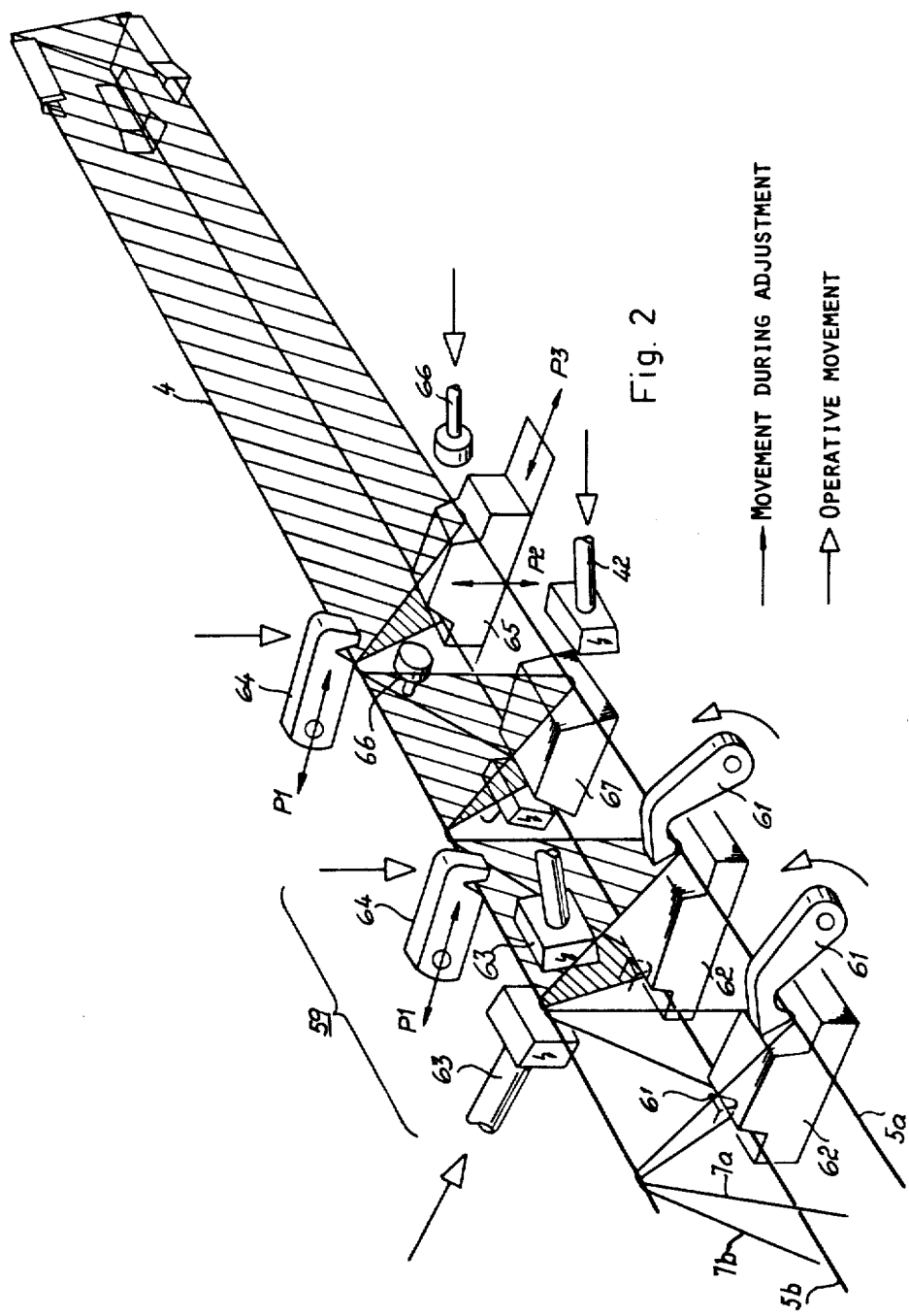
FIG. 2 is a diagrammatic perspective view of the welding region of the machine.

Entirely similar hydraulic control circuits which are likewise actuated by other control cams 24 may be employed for the plungers 33, 34, 35 acting as wire clamps in the feed mechanism according to FIGS. 3a and 3b and for the adjusting-and-holding fingers 61 of the welding mechanism 59 according to FIG. 2.

The speed at which, for example, the feed mechanism 6 is moved to and fro along the sliding guide 31 by the crank 28 depends upon the rotations per minute of the crank 28 and hence upon the working speed of the whole machine. The longer the time which elapses from the instant at which the command is given by a valve 54 for the moving of the plungers 33 against the chord wires 4, 5a, 5b until that instant at which these plungers actually seize the chord wires, the longer is the travel which the feed mechanism 6 covers backwards along the sliding guide 31 without taking the chord wires along with it, which is a travel which may be designated as "idle stroke". By the cam control previously described the idle stroke may be fixed at a constant value which is completely independent of the working speed of the machine so that the required feed travel of the chord wires is always maintained precisely.

The described embodiment of the invention allows of various modifications. Whilst the drive of the electrodes 42, 63 and the actuation of the wire clamps 33, 34, 35 of the feed mechanism 6 are best effected hydraulically as described, other machine parts such, in particular, as the adjusting-and-holding fingers 61, the guides 64 and the dollies 66 may also be actuated purely mechanically or electromechanically.

We claim:

1. In a machine for the automatic production of a welded lattice girder which consists of an upper chord, at least one lower chord and zigzag strutting between said upper chord and said lower chord defining periodic bending regions, said machine comprising a feed mechanism for the stepwise feeding of wire material for said chords, a continuously working bending mechanism for the production of a stock of said zigzag strutting, and an intermittently working welding mechanism for welding the bending regions of said strutting to said chords; the improvements wherein between said bending mechanism and said welding mechanism there are provided guides adapted to embrace said bending region of said zigzag strutting and leading substantially tangentially into paths along which said upper and lower chord wires are respectively fed, whereby said guides form storage means for said strutting in which said strutting is arranged to be resiliently contracted and expanded in a controlled manner, and wherein said welding mechanism includes two holding fingers adjacent said feed path for said lower chord wire and offset with respect to one another in the direction of feed by one wavelength of said zigzag strutting and means causing said holding fingers to be inserted into adjacent lower bending regions in said zigzag strutting to hold the strutting in place during pauses used for welding between two steps in the stepwise feed of said chord wires to thereby fix the required relative positions between said strutting and said chord wires during welding, the welding being done at a lower bending region which is spaced from the adjacent lower bending regions held in place by the holding fingers by at least one wavelength of zigzag.

2. A machine according to claim 1, wherein there is a common motor drive for said feed mechanism for said chord wires and for said bending mechanism; and wherein said stepwise feed mechanism for said chord wires comprises clamps adapted to grip said chord wires; and hydraulic drives are provided for said clamps, for tilting said holding fingers, and for moving welding electrodes of said welding mechanism; each of said hydraulic drives comprising a fluid pressure operated cylinder with a piston acted upon by fluid pressure supplied via a spring-loaded valve which is controlled by a cam, the length of said cylinder and the duration of operation of said valve for the return stroke of said piston being so matched relatively to one another that the return travel of said piston is proportional to the duration of said operation of said valve.

* * * * *